Dec. 22, 1925.
C. H. LISTER
FRUIT CLEANING MACHINE
Filed July 30, 1924
1,566,611
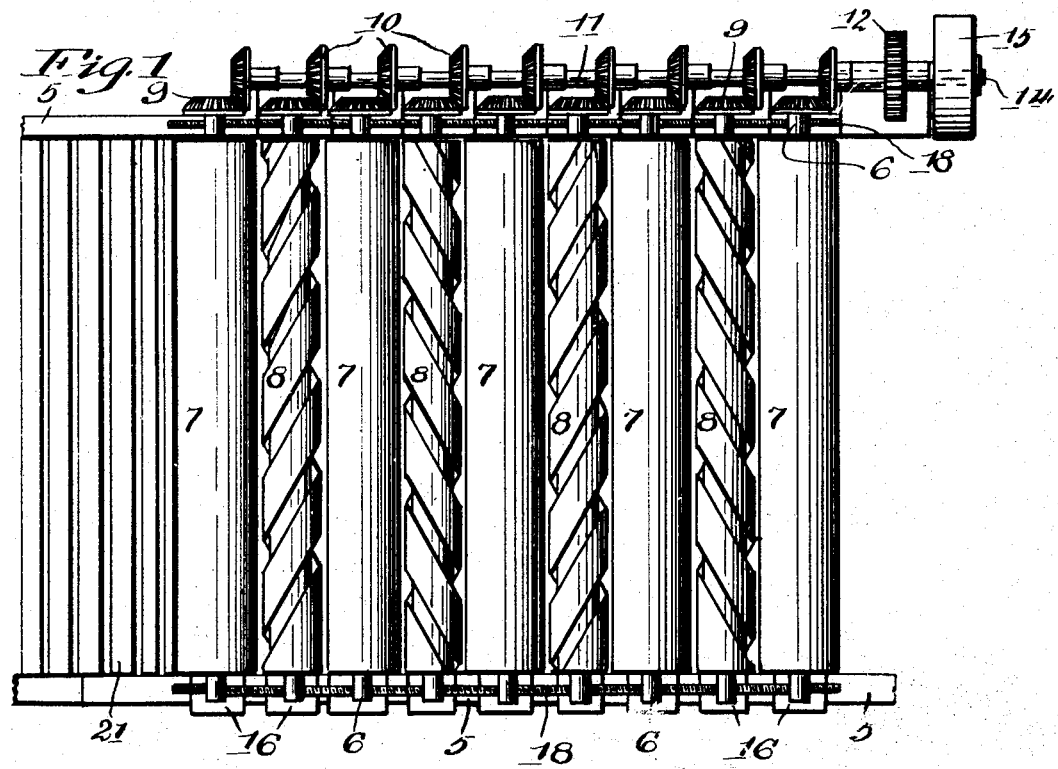
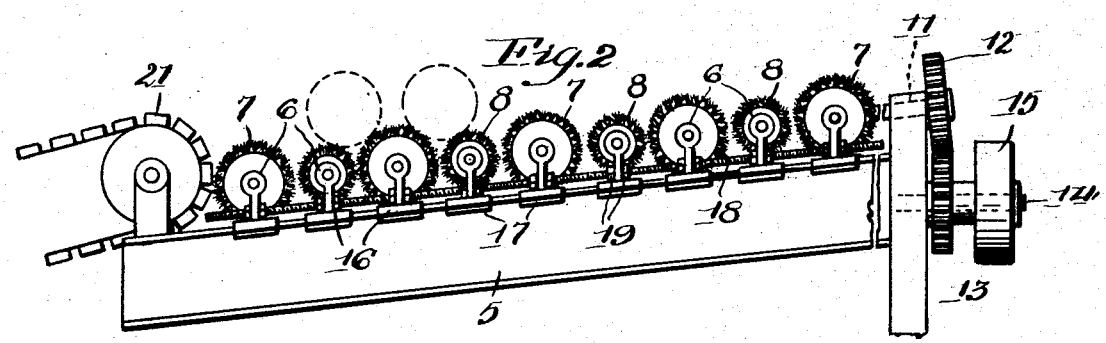
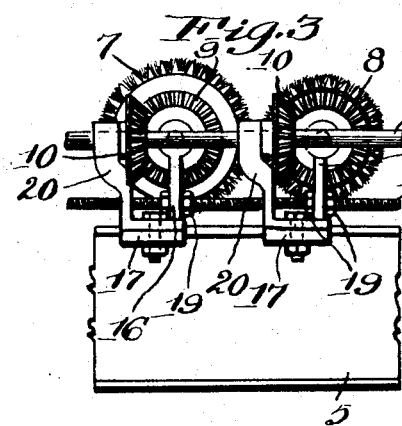
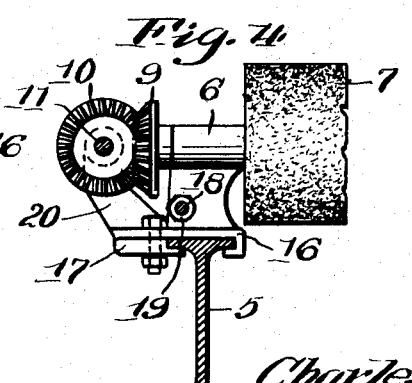
INVENTOR
Charles H. Lister
BY John E. Stryker
ATTORNEY Patented Dec. 22, 1925.

1,566,611

UNITED STATES PATENT OFFICE.

CHARLES H. LISTER, OF THONOTOSASSA, FLORIDA.

FRUIT-CLEANING MACHINE.

Application filed July 30, 1924. Serial No. 729,079.

*To all whom it may concern:*

Be it known that I, CHARLES H. LISTER, a citizen of the United States, residing at Thonotosassa, in the county of Hillsborough and State of Florida, have invented new and useful Improvements in Fruit-Cleaning Machines, of which the following is a specification.

The object of this invention is to provide a machine adapted to thoroughly and rapidly cleanse the rough, porous rinds of citrous fruit.

More particularly it is my object to improve the efficiency and increase the capacity of such a machine by providing a series of parallel revolving brushes arranged to convey and simultaneously cleanse an unusually large amount of fruit in a given time while turning the same transverse the main direction of travel and thus insuring thorough brushing of the entire surface of the fruit.

This invention also includes means whereby the brushes of a fruit cleaning machine may be quickly and easily adapted to cleanse fruit of differing sizes and to compensate for wear on the brushes.

In the accompanying drawings I have illustrated the best form of my device at present known to me. Referring to the drawings, Figure 1 is a plan view of my improved machine; Fig. 2 is a side elevation of the same; Fig. 3 is a detail elevation of the end of a pair of the brushes opposite that shown in Fig. 2; and Fig. 4 is a transverse section through one of the longitudinal frame members of the machine showing one of the brushes and driving mechanism in elevation.

The machine is supported in a suitable frame having parallel I beams 5 disposed beneath and supporting journaled bearings 6 for series of parallel, cylindrical brushes 7 and 8. These brushes 7 and 8 are mounted with their axes in substantially the same plane so that their upper peripheries form a carrier surface for the fruit to be cleansed. The brushes are driven by a plurality of beveled gears 9 fast on the ends of axial shafts in the brushes and the gears 9 mesh with similar gears 10 on a drive shaft 11. The several brushes are thus driven in a direction to cause fruit delivered to their upper peripheries to be carried transverse the axes of the brushes. The bristles of the brushes 8 are arranged spirally so as to roll or turn the fruit obliquely of the brushes simultaneously with the transverse movement. To increase this oblique movement, the brushes 8 are made somewhat smaller in diameter than the brushes 7 so that the fruit in passing from one of the brushes 7 to another rests on the brushes 8 having spirally disposed bristles. To prevent the fruit from being carried over the ends of the brushes, the pitch of the spirals on adjacent brushes 8 is oppositely directed. Thus, the fruit is rolled obliquely to the left by one of the brushes 8 and then to the right by the succeeding brush 8.

To still further increase the effect of the brushes 8, the machine frame is preferably placed at an incline with the delivery end higher than the receiving end, as shown in Fig. 2. This causes a retarding of the fruit between the large brushes 7, which further insures vigorous brushing and thorough cleansing. Where the machine is placed on an incline, I prefer to drive the shaft 11 by means of beveled gears 12 and 13, the latter gear being mounted on a counter shaft 14 having a drive pulley 15.

The efficiency of the brushing is dependent to a certain extent upon proper spacing of the several brushes 7 and 8. Thus, the retarding effect of the valleys or grooves between the large brushes 7 is less upon small fruit and when the brushes become worn than upon the larger fruit or when the brushes are stiff and new. I therefore make it possible to secure practically constant retarding effects under differing conditions by adjustment of the spacing of the brushes. This adjustment is secured by slidably mounting the bearings 6 upon brackets 16 provided with clamping members 17. Extending through suitable perforations in the several brackets 16 is a threaded rod 18 having pairs of nuts 19 which may be turned to engage opposite surfaces of said brackets. At the driven end of the brushes the brackets 16 are also provided with upwardly projecting arms 20 formed with journaled bearings for the drive shaft 11, the beveled gears 10 being slidable longitudinally on said shaft but fixed against rotation thereon. As will now be readily understood, to change the spacing of the brushes, it is only necessary to loosen the clamps 17 and nuts 19 and after moving the several brushes to the desired positions, again tighten said clamps and nuts.

In operation, I prefer to deliver the fruit to the brushes by a suitable slat conveyor 21 of common type, and while the fruit is on said conveyor to spray the same from above and thus wash off leaves and other débris which can be removed by rinsing. The moist, rinsed fruit is thus delivered to the brushes 7 and 8 at the lower end of the incline. The brushes are continuously driven in such a direction as to cause the fruit to be carried up the incline, transverse the axes of the brushes. The fruit as it passes up the incline is rolled from one side to the other by the brushes 8 until it is finally delivered at the upper end of the machine. The fruit may now be dried and packed. On account of the large area available for carrying the fruit, a large amount can be cleansed in a relatively short time. When the brushes become worn, they can be set closer together by manipulating the clamps 17 and nuts 19 as described above. While in the illustrated embodiment of my machine the several brushes 7 and 8 are all rotated in one direction, it will be evident that by a slight modification certain of said rollers might be reversed to further retard the fruit, and any such modification is considered within the spirit of my invention.

Having described my invention what I claim as new and desire to protect by Letters Patent is:

1. In a machine of the class described a series of cylindrical brushes arranged to convey fruit transverse their axes, certain of said brushes being of substantially smaller diameter than others and the bristles on said smaller brushes being disposed spirally thereon to turn fruit longitudinally of said brushes.

2. In a machine of the class described, a plurality of cylindrical brushes revolubly mounted in parallel relation one to the other, brushes having spirally arranged bristles severally interposed between said first mentioned brushes and arranged to form a continuous carrier surface for fruit to be cleansed, means for rotating said brushes to carry fruit transverse the same, the bristles on certain of said spiral brushes being arranged to turn fruit longitudinally of the brushes in one direction and the bristles on certain of the other brushes being disposed to turn fruit longitudinally in the opposite direction.

3. In a machine of the class described, a series of cylindrical brushes revolubly mounted in parallel relation one to the other, a second series of brushes having spirally arranged bristles severally interposed between said first mentioned brushes and arranged to form therewith a continuous carrier surface for fruit to be cleansed, parallel supports for the ends of said brushes, journal bearings for the several brushes independently slidable on said supports, means for rotating said brushes in said bearings, and means for rigidly securing said bearings in predetermined positions on said supports.

4. In a machine of the class described, a plurality of cylindrical brushes revolubly mounted in parallel relation one to the other, brushes having spirally arranged bristles severally interposed between said first mentioned brushes and arranged to form therewith a continuous carrier surface for fruit to be cleansed, parallel, inclined supports for the ends of said brushes, journal bearings for the several brushes independently slidable on said supports, means for rotating said brushes in said bearings in a direction to carry fruit up the incline and means for rigidly securing said bearings in predetermined positions on said supports.

5. In a machine of the class described, a series of cylindrical, spaced brushes arranged to convey fruit transverse their axes, bristles on certain of said brushes disposed spirally to urge fruit obliquely across the brushes, and means for varying the spacing of said brushes.

In testimony whereof, I have hereunto signed my name to this specification.

CHARLES H. LISTER.